United States Patent
Yang et al.

(10) Patent No.: US 11,175,251 B2
(45) Date of Patent: Nov. 16, 2021

(54) PRODUCT PERFORMANCE TEST METHOD AND SYSTEM

(71) Applicant: CQC INTIME TESTING TECHNOLOGY CO., LTD., Suzhou (CN)

(72) Inventors: Zonghui Yang, Suzhou (CN); Conglin Huang, Suzhou (CN); Jie Wang, Suzhou (CN)

(73) Assignee: CQC INTIME TESTING TECHNOLOGY CO., LTD, Suzhou (CN)

(*) Notice: Subject to any disclaimer, the term of this patent is extended or adjusted under 35 U.S.C. 154(b) by 0 days.

(21) Appl. No.: 17/274,787

(22) PCT Filed: Mar. 25, 2019

(86) PCT No.: PCT/CN2019/079509
§ 371 (c)(1),
(2) Date: Mar. 10, 2021

(87) PCT Pub. No.: WO2020/186539
PCT Pub. Date: Sep. 24, 2020

(65) Prior Publication Data
US 2021/0318257 A1    Oct. 14, 2021

(30) Foreign Application Priority Data
Mar. 18, 2019 (CN) .......................... 201910205610.8

(51) Int. Cl.
| | |
|---|---|
| *G01N 25/00* | (2006.01) |
| *G01K 17/00* | (2006.01) |
| *G01K 1/00* | (2006.01) |
| *G01N 25/20* | (2006.01) |
| *G01M 99/00* | (2011.01) |

(52) U.S. Cl.
CPC .......... *G01N 25/20* (2013.01); *G01M 99/002* (2013.01)

(58) Field of Classification Search
USPC .............................................. 374/43, 141, 29
See application file for complete search history.

(56) References Cited

U.S. PATENT DOCUMENTS

| | | | | |
|---|---|---|---|---|
| 5,039,228 A | * | 8/1991 | Chalmers | G01N 3/60 374/57 |
| 5,622,430 A | | 4/1997 | Pletka et al. | |
| 6,460,355 B1 | * | 10/2002 | Trieskey | F25B 7/00 62/175 |
| 2007/0047614 A1 | | 3/2007 | Lee et al. | |
| 2015/0185171 A1 | * | 7/2015 | Tiwari | F24S 80/20 374/43 |
| 2021/0239668 A1 | * | 8/2021 | Reuschel | F25B 9/008 |

FOREIGN PATENT DOCUMENTS

| | | |
|---|---|---|
| CN | 101813651 A | 8/2010 |
| CN | 105207205 A | 12/2015 |
| CN | 105931136 A | 9/2016 |
| CN | 106405223 A | 2/2017 |
| CN | 106960272 A | 7/2017 |
| CN | 108663403 A | 10/2018 |
| CN | 108760807 A | 11/2018 |
| RU | 2015483 C1 | 6/1994 |

* cited by examiner

*Primary Examiner* — Mirellys Jagan
(74) *Attorney, Agent, or Firm* — Bayramoglu Law Offices LLC

(57) ABSTRACT

A product performance test method and system are provided. The product performance test method includes: at least testing a specific heat capacity C of a heat storage material of a sample, a heat transfer coefficient K, an energy efficiency ratio E of a refrigeration system, and a mass m of the heat storage material contained in the sample to detect a performance level of the sample. The method provided tests four key factors: the specific heat capacity C of the heat storage material of a product, the heat transfer coefficient K, the energy efficiency ratio E of the refrigeration system, and the mass m of the heat storage material in a box.

1 Claim, No Drawings

PRODUCT PERFORMANCE TEST METHOD AND SYSTEM

CROSS REFERENCE TO THE RELATED APPLICATIONS

This application is the national stage entry of International Application No. PCT/CN2019/079509, filed on Mar. 25, 2019, which is based upon and claims priority to Chinese Patent Application No. 201910205610.8, filed on Mar. 18, 2019, the entire contents of which are incorporated herein by reference.

TECHNICAL FIELD

The present disclosure particularly relates to a product performance test method and system, and belongs to the technical field of performance tests.

BACKGROUND

Environmental test equipment plays an important role in development of the national economy. In recent years, as applications are increasingly extensive and technologies are upgraded continuously, environmental test equipment manufacturers have higher and higher technical requirements for products, prompting many manufacture factories to move closer to advanced technologies in the world, but there are still a large number of enterprises occupying low-end positions of an industrial chain, resulting in a great difference in energy consumption of products and a prominent difference in energy saving effects.

At the present, a method for performing a product performance test on the environmental test equipment cannot be widely representative due to its larger test workload and limited selected test points. Therefore, there are defects such as high test cost and an unscientific test method. Similarly, existing methods for testing thermal insulation devices, thermal insulation materials, etc. also have similar defects.

SUMMARY

For the deficiencies in the prior art, the present disclosure is mainly directed to provide a product performance test method and system.

In order to achieve the foregoing invention objective, the technical solutions used by the present disclosure include:

The embodiments of the present disclosure provide a product performance test method, including: at least testing a specific heat capacity C of a heat storage material of a sample, a heat transfer coefficient K, an energy efficiency ratio E of a refrigeration system, and a mass m of the heat storage material contained in the sample, so as to detect the performance level of the sample.

Further, the product performance test method includes: at least testing the specific heat capacity C of the heat storage material of the sample and the heat transfer coefficient K of the sample, testing the energy efficiency ratio E of the refrigeration system of the sample and the mass m of the heat storage material contained in the sample at a constant temperature phase, and testing the mass m of the heat storage material contained in the sample at a temperature varying phase, so as to detect the performance level of the sample.

Further, the product performance test method includes: testing the energy efficiency ratio E of the refrigeration system of the sample and the mass m of the heat storage material contained in the sample at a thermal load test phase, so as to detect the performance level of the sample.

Further, at the constant temperature phase, a heat leakage amount of the sample is $Q=tKS\Delta T$ where t is time of heat exchange occurring between interior and exterior of a cavity of the sample; K is the heat transfer coefficient of the sample; S is a heat exchange area of the sample; and $\Delta T$ is an internal and external environmental temperature difference of the cavity of the sample.

Further, at the temperature constant phase, $$E = \frac{p_1 + p_3}{p_2}$$

is set up where P1 is a power value of a resistive element in the sample; P2 is an input power value of the sample; and P3 is a heat leakage power value of the sample.

Further, at the temperature varying phase, a heat storage amount of the sample is $Q=Cm\Delta T'$ where C is the specific heat capacity of the heat storage material in the sample; m is a total mass of the heat storage materials in the sample; and $\Delta T'$ is an initial temperature difference of the heat storage materials in the cavity.

Further, at the temperature varying phase, a heat leakage amount of the sample is $Q=tKS\Delta T$ where t is the time of heat exchange occurring between interior and exterior of the cavity of the sample; K is the heat transfer coefficient of the sample; S is the heat exchange area of the sample; and $\Delta T$ is the internal and external environmental temperature difference of the cavity of the sample. In addition, as time goes on, the heat leakage amount of the sample at the temperature varying phase dynamically changes.

Further, at the thermal load test phase, $$E = \frac{p_1 + p_3}{p_2}$$

is set up where P1 is the power value of the resistive element in the sample; P2 is the input power value of the sample; and P3 is the heat leakage power value of the sample.

Further, the sample is environmental test equipment.

The embodiments of the present disclosure further provide a product performance test system, including a temperature modulation module, a temperature monitoring module and a control module. The control module is connected to the temperature modulation module and the temperature monitoring module. The product performance test system further includes an operation instruction. The operation instruction records the product performance test method.

Compared with the prior art, the test method of the present disclosure can be used to realize accurate test on the performance of the sample, greatly reduces the workload of test, and is more scientific and reasonable, so that the test method has a wide application prospect in the test fields of environmental test equipment, heat preservation equipment, and the like.

DETAILED DESCRIPTION OF THE EMBODIMENTS

As mentioned above, since an existing product performance test method has the defects of a large test workload, an unscientific recognition method, and the like, the inventors of this case has put forward to the technical solutions of the present disclosure after a long period of research and a lot of practice. The technical solutions are mainly to quantitatively analyze the energy consumption of a sample by means of testing key factors such as a specific heat capacity C of a heat storage material of the sample, a heat transfer coefficient K, an energy efficiency ratio E of a refrigeration system, and a mass m of the heat storage material in the sample, so as to realize a test on the performance of the sample. The technical solutions, and implementation processes and principles thereof will be further explained and described below.

The embodiments of the present disclosure provide a product performance test method, including: at least testing a specific heat capacity C of a heat storage material of a sample, a heat transfer coefficient K, an energy efficiency ratio E of a refrigeration system, and a mass m of the heat storage material contained in the sample, so as to detect the performance level of the sample.

Further, the product performance test method includes: at least testing the specific heat capacity C of the heat storage material of the sample and the heat transfer coefficient K of the sample, testing the energy efficiency ratio E of the refrigeration system of the sample and the mass m of the heat storage material contained in the sample at a constant temperature phase, and testing the mass m of the heat storage material contained in the sample at a temperature varying phase, so as to detect the performance level of the sample.

Further, the product performance test method includes: testing the energy efficiency ratio E of the refrigeration system of the sample and the mass m of the heat storage material contained in the sample at a thermal load test phase, so as to detect the performance level of the sample.

Further, at the constant temperature phase, a heat leakage amount of the sample is Q=tKSΔT where t is time of heat exchange occurring between interior and exterior of a cavity of the sample; K is the heat transfer coefficient of the sample; S is a heat exchange area of the sample; and ΔT is an internal and external environmental temperature difference of the cavity of the sample.

Further, at the temperature constant phase, $$E = \frac{P_1 + P_3}{P_2}$$

is set up where P1 is a power value of a resistive element in the sample; P2 is an input power value of the sample; and P3 is a heat leakage power value of the sample.

Further, at the temperature varying phase, a heat storage amount of the sample is Q=CmΔT' where C is the specific heat capacity of the heat storage material in the sample; m is a total mass of the heat storage material in the sample; and ΔT' is an initial temperature difference of the heat storage material in the cavity.

Further, at the temperature varying phase, a heat leakage amount of the sample is Q=tKSΔT where t is the time of heat exchange occurring between interior and exterior of the cavity of the sample; K is the heat transfer coefficient of the sample; S is the heat exchange area of the sample; and ΔT is the internal and external environmental temperature difference of the cavity of the sample. In addition, as time goes on, the heat leakage amount of the sample at the temperature varying phase dynamically changes.

Further, at the thermal load test phase, $$E = \frac{P_1 + P_3}{P_2}$$

is set up where P1 is the power value of the resistive element in the sample; P2 is the input power value of the sample; and P3 is the heat leakage power value of the sample.

Further, the sample is environmental test equipment.

The embodiments of the present disclosure further provide a product performance test system, including a temperature modulation module, a temperature monitoring module and a control module. The control module is connected to the temperature modulation module and the temperature monitoring module. The product performance test system further includes an operation instruction. The operation instruction records the product performance test method.

The principle of the test method of the present disclosure will be described in detail below. Environmental test equipment is taken as an example. Phases that affect the energy consumption of the environmental test equipment mainly include: a constant temperature phase, a temperature varying phase and a thermal load test phase (which are not applicable for thermal load tests for some environmental test equipment that does not have a refrigeration function, but only has a heating function). The following is analyzed from the three phases.

1. Factors that Affect the Energy Efficiency at the Constant Temperature Phase 1.1: Heat Leakage of Equipment Q=tKSΔT    Formula 1), where t is time of heat exchange occurring between interior and exterior of a cavity of the environmental test equipment (a temperature control box is taken as an example below, which can be referred to as the box body), the unit of which is s; K is a heat transfer coefficient of the environmental test equipment, the unit of which is (W/m²·K); S is a heat exchange area S of the environmental test equipment, the unit of which is (m²); and ΔT is an internal and external environmental temperature difference of a cavity of the environmental test equipment (which may be referred to as the temperature difference), the unit of which is (K).

By means of the formula 1), it can be obtained that the heat leakage amount of the environmental test equipment is related to the heat transfer coefficient K of the environmental test equipment, a surface area S of the environmental test equipment and the heat exchange temperature difference ΔT. There are two factors that can be controlled by an enterprise: The first one is to use a material with low heat conduction coefficient as a thermal insulation material; and the second one is to design the box (an inner volume) into a cube.

1.2: Thermal Load Capacity Energy Efficiency (i.e., an Energy Efficiency Ratio of a Refrigeration System)

E=(P1+P3)/P2 where E is the thermal load capacity energy efficiency of the environmental test equipment. If the refrigeration performance is better, the energy efficiency is higher. P1 is a power value of a resistive element, the unit of which is watt (W); P2 is an input power value of a test box, the unit of which is watt (W); P3 is a heat leakage power value of the test box, the unit of which is watt (W); $P_3$=KSΔT, ΔT is an internal and external environmental temperature difference of the cavity of the environmental test equipment; K is the heat transfer coefficient of the sample; and S is the heat exchange area of the environmental test equipment.

The thermal load capacity can reflect the load capacity of the environmental test equipment. The thermal load capacity energy efficiency reflects conversion efficiency of the environmental test equipment. This is similar to the energy efficiency of an air conditioner. A factor that affects the energy efficiency is mainly optimization for the refrigeration system.

2. Factors that Affect the Energy Efficiency at the Temperature Varying Phase 2.1: Heat Storage of a Material in the Box Body $Q=Cm\Delta T'$ Formula 2) where C is a specific heat capacity of a heat storage material in the environmental test equipment, the unit of which is J/(kg·°C.); m is a total mass of all heat storage materials in the environmental test equipment, the unit of which is kg; and $\Delta T'$ is an initial temperature difference of the heat storage materials in the cavity, the unit of which is °C.

By means of the formula 2), it can be seen that the specific heat capacity C of the heat storage material is related to the total mass m of the heat storage materials (all materials that participate in heat storage in the box body) in the box body and the initial temperature difference $\Delta T'$ of the heat storage materials in the cavity. It is found by means of a previous test comparison that cold and heat which are made by electric energy consumed by the box are mostly consumed by the materials in the box body for heat storage, and a little of heat is retained for temperature varying of an environment in the box.

2.2: System Heat Leakage

The principle is the same as that in 1.1, but the computing process is more complicated than that at a constant temperature. Since a temperature in the box body continuously changes at the whole temperature varying phase, as time goes by, the heat leakage amount Q is always in a dynamic changing process (there are two variables) according to a heat leakage formula $Q=tKS\Delta T$.

2.3: Thermal Load Capacity Energy Efficiency (i.e., an Energy Efficiency Ratio of a Refrigeration System)

Same as above 1.2

3: Factors that Affect the Energy Efficiency at the Thermal Load Test Phase

Same as above 1.2

To sum up, the main factors that affect the energy consumption of the environmental test equipment include: the heat transfer coefficient K, the inner surface area S of the box, the temperature difference $\Delta T$, the energy efficiency ratio E of the refrigeration system, the specific heat capacity C of a material, and mass m of the heat storage material in the box. Since the shape design of a product is determined by functional requirements of the product, in order to ensure the fairness of comparison, the area S here is not used as a factor to determine whether the box is energy-saving. The present disclosure mainly provides comparisons of the heat transfer coefficients K of different boxes, the specific heat capacities C of the materials, the masses m of the heat storage materials in the box bodies, and the energy efficiency ratios E of the refrigeration systems.

The method provided by the present disclosure tests four key factors: the specific heat capacity C of the heat storage material, the heat transfer coefficient K, the energy efficiency ratio E of the refrigeration system, and the mass m of the heat storage material in the box body (the importance degrees of which are gradually decreased) of the product to perform quantitative analysis on the energy consumption of the environmental test equipment.

Another aspect of the embodiments of the present disclosure further provide a product performance test system, including a temperature modulation module, a temperature monitoring module and a control module. The control module is connected to the temperature modulation module and the temperature monitoring module. The product performance test system further includes an operation instruction. The operation instruction records the product performance test method. The temperature modulation module, the temperature monitoring module and the control module can all use existing detection modules, and can all be purchased in the market. Program codes and the like designed in a used numerical control program can also be purchased in the market.

The technical solutions of the present disclosure are further explained and described below in combination with some more specific embodiments.

The following embodiments provide a performance test method for environmental test equipment. The method includes:

1. Measurement of a Heat Transfer Coefficient K

First of all, environmental test equipment to be tested (i.e., a box body of a temperature control box) is placed at a certain environmental temperature (such as 25°C.); a resistive element is put into the box body; a door and a test hole are closed, and the temperature is set to be a certain temperature (such as 125°C.); this temperature is maintained stable for 2 h; and the power consumption of the resistive element after 1 h is recorded and denoted by E1. Secondly, an inner surface area of the box body is measured and denoted by S, thereby obtaining the K value of the test equipment.

$$K = \frac{E_1 \times 3600}{S \times 100 \times 3600}.$$

2. Measurement of a Specific Heat Capacity C of a Heat Storage Material in the Box Body First of all, the test box is placed under a specified test condition (such as 25°C.) for presetting for at least 2 h to cause temperatures inside and outside the test box to be consistent with an environmental temperature. Secondly, the resistive element is put into the box body, and temperature points are arranged according to the requirement of the article 6.3.1 of GB/T10592-2008 (Note: A temperature collection device must be capable of recording time and temperature values of a whole temperature rise process, and a sampling frequency shall not be less than 1 per second). A fan (Fan blades are arranged inside the box body, and a motor part is arranged outside the box body; and the test hole should be sealed and thermally insulated) is then added by means of the test hole to perform forced convection on air in the box body. Finally, the door is closed, and the resistive element is powered up to cause the temperature in the box body to rise to a certain temperature (such as 125°C.); the temperature is maintained for a period of time to let a material in the box body complete heat storage (when the environmental temperature in the box body reaches 125°C. for the first time, it is started to record the time; stabilization time is determined by means of observing variations of a power value of a power meter connected in series to the resistive element; and if a variable of the power within 1 min is less than 5 W, it is determined that the heat storage ends, and constant temperature time t' is recorded); a power consumption E2, temperature rise time t and a numeric value of the temperature T in the box body of the resistive element, and a mass m of the material in the box body in the whole process are recorded; and the specific heat capacity C of the material is calculated according to the following formula.

The temperature rise time t is split into n Δts that tend to 0. Q(t) changes a little within a very short period of time, and is approximately invariant, so that it is calculated that a heat leakage amount of the box at the first second is: $q_1 = K \cdot S (T_1 - 25)$ a heat leakage amount at the second second is: $q_2 = K \cdot S (T_2 - 25)$ a heat leakage amount at the nth second (the time corresponding to the environmental temperature 125° C.) is: $q_n = K \cdot S (125 - 25)$ At the temperature rise phase, $Q_{rise\text{-}leakage} = q_1 + q_2 + \cdots + q_n = \int_0^t Q(t) dt$ The time and the temperature which are collected by a temperature rise collector are substituted into the formulas to obtain the heat leakage amount.

At the constant temperature phase $Q_{constant\text{-}leakage} = K \cdot S \cdot (125 - 25) \cdot t'$ The heat absorbed by the air in the box body is $Q_{air\text{-}storage} = 100 \cdot c \cdot V \cdot p$.

3. Measurement of the Performance E of a Refrigeration System

The resistive element is put into the box body; the door and the test hole are closed; a lowest temperature that the test box can reach is selected from two feature temperature points −25° C. and −55° C. as a test temperature, and is maintained stable; the power of the resistive element is then gradually increased to a maximum power capable of enabling the test box to keep the temperature stable again, and an input power value of the resistive element is recorded and denoted by P1; at the same time, an input power of the test box is tested and denoted by P2; at the same time, a heat leakage power P3 (P3=KSt where t is internal and external heat exchange time of a sample, K is a heat transfer coefficient of the sample, and S is a heat exchange area of the sample); and thereby, the E value of the refrigeration system is obtained, $E = (P1 + P3)/P2$ Embodiment 1

A low- and high-temperature test box provided with a cubic inner cavity and having a volume of 1 m3 was used as a test object, and the mass of a heat storage material in the box body was 80 kg.

1. Measurement of a Heat Transfer Coefficient K of the Test Box

A temperature in the test box was set to be 125° C. and maintained for 2 h; and a power meter was used to measure that the power consumption of the last hour was 700 Wh, $$K = \frac{E_1 \times 3600}{S \times 100 \times 3600} = \frac{700 \times 3600}{6 \times 100 \times 3600} = 1.17 (W/m^2 \cdot K)$$

2. Measurement of a Specific Heat Capacity C of the Heat Storage Material in the Test Box The test box was placed in an environment 25° C. for 2 h to cause temperatures inside and outside the test box to be consistent with an environmental temperature. The resistive element was put into the box body, and temperature collection points were arranged according to the requirement of the article 6.3.1 of GB/T10592-2008. A fan (Fan blades were arranged inside the box body, and a motor part was arranged outside the box body) was then added to perform forced convection on air in the box body. Finally, the door was closed, and the resistive element was powered up to cause the temperature in the box body to rise to 125° C.; the temperature was maintained for a period of time to let the heat storage material in the box body complete heat storage (when the environmental temperature in the box body reached 125° C. for the first time, it was started to record the time; stabilization time was determined by means of observing variations of a power value of a power meter connected in series to the resistive element; and if a variable of the power within 1 min was less than 5 W, it was determined that the heat storage ended, and constant temperature time t' was recorded as 18 min); and the power consumption 1400 Wh of the resistive element in the whole process, and a correspondence relationship between the temperature rise time (10 min) and the temperature T in the box body as well as the heat leakage amount were recorded. The correspondence relationship between the time and the temperature in the temperature rise process of the test box is as shown in Table 1;

Table 1 Correspondence relationship table among the time, the heat leakage amount and the temperature in the test box within 10 min

| Time | Temperature in the box body | Dynamic heat leakage amount Q |
|---|---|---|
| 0:00:01 | 25.1 | 0.702 |
| 0:00:02 | 25.4 | 2.808 |
| 0:00:03 | 25.7 | 4.914 |
| 0:00:04 | 26.0 | 7.02 |
| 0:00:05 | 26.3 | 9.126 |
| 0:00:06 | 26.6 | 11.232 |
| 0:00:07 | 26.9 | 13.338 |
| 0:00:08 | 27.2 | 15.444 |
| 0:00:09 | 27.5 | 17.55 |
| 0:00:10 | 27.8 | 19.656 |
| ... | ... | ... |
| 0:09:49 | 124.0 | 694.98 |
| 0:09:50 | 124.1 | 695.682 |
| 0:09:51 | 124.2 | 696.384 |
| 0:09:52 | 124.3 | 697.086 |
| 0:09:53 | 124.4 | 697.788 |
| 0:09:54 | 124.5 | 698.49 |
| 0:09:55 | 124.6 | 699.192 |
| 0:09:56 | 124.7 | 699.894 |
| 0:09:57 | 124.8 | 700.596 |
| 0:09:58 | 124.8 | 700.596 |
| 0:09:59 | 124.9 | 701.298 |
| 0:10:00 | 125.0 | 702 |

The temperatures and the dynamic heat leakage amounts within the period of time from 0:00:11 to 0:09:48 were omitted, wherein the heat leakage amount at the nth second was: $q_n = K \cdot S (125 - 25)$ At the temperature rise phase, $Q_{rise\text{-}leakage} = \int_0^t Q(t) dt = 245486.592 \text{ J}$ Note: The temperature rise time and the corresponding temperature data are introduced into EXCEL Table 1, and the heat leakage in the temperature rise process can be calculated using the above formula.

$Q_{constant\text{-}leakage} = K \cdot S \cdot (125-25) \cdot t' = 18 \times 60 \times 100 \times 6 \times 1.17 = 758160 \text{ J}$ $Q_{air\text{-}storage} = 100 \cdot c \cdot V \cdot p = 100 \times 1.004 \times 1000 \times 1.185 \times 1 = 118974 \text{ J}$ $Q_{storage} = 3600 E_2 - Q_{rise\text{-}leakage} - Q_{constant\text{-}leakage} - Q_{air\text{-}storage} = 3600 \times 1400 - 245486.59 - 758160 - 118974 = 3917379.41 \text{ J}$ $C = Q_{storage}/100m = 489.67 \text{ J}/(kg \cdot °C.)$.

3. Measurement of the Performance E of a Refrigeration System

The lowest temperature of the test box can reach −40° C., and −25° C. was used as a test temperature which was maintained stable. The power of the resistive element was then gradually increased till it reached a maximum power capable of enabling the test box to keep the temperature stable again, and an input power value P1 of the resistive element was recorded to be 800 W; and at the same time, an input power P2 of the test box was tested to be 2400 W.

$$P3 = 1.17 \times 6 \times 50 = 351 W$$

$$E = \frac{p_1 + p_3}{p_2} = (800 + 351)/2400 = 0.48.$$

The embodiments of the present disclosure provide a product performance test method, rather than a determination method, which can be used indirectly as a standard or basis for determining whether a product is qualified, or may not be used as a standard or basis for determining whether a product is qualified. An existing product performance test method generally uses a mode for directly testing the energy consumption (such as the power consumption) of a sample to test the performance of the sample, and the present disclosure indirectly reflects the energy consumption level of the sample mainly by means of testing four key factors (the specific heat capacity C of the heat storage material, the heat transfer coefficient K, the energy efficiency ratio E of the refrigeration system, and the mass m of the heat storage material in the box body), and avoids the boundedness caused by artificial setting of certain points (such as constant temperature energy efficiency assessment points set in GB/T 33861-2017) to assess the performance of the product. In addition, the test method is simpler and more scientific and reasonable, and has a wide application prospect. It can be applied to the environmental test box industry, and all thermal insulation products can be assessed using the method of the present disclosure.

The test method provided by the present disclosure breaks through conventional conventions, indirectly reflects the energy consumption level of the box through the test of the four key factors, and provides an automatic adjustment resistive element (PID) for measuring the key factors. The automatic adjustment resistive element used in the present disclosure is a component that can realize functions such as automatic heating and electric energy integration, and constitution parts of the automatic adjustment resistive element can be obtained commercially. The test method provided by the present disclosure is widely used. It can not only be applied to the environmental test box industry, but also be used to assess all thermal insulation products. The method can measure the thermal insulation performance of a product and other performance of the product.

It should be understood that the above-mentioned embodiments are merely illustrative of the technical concept and features of the present disclosure, and their purpose is to enable those skilled in the art to understand the content of the present disclosure and implement them accordingly, and should not limit the protection scope of the present disclosure. All equivalent changes or modifications made according to the spirit of the present disclosure shall fall within the protection scope of the present disclosure.

What is claimed is:

1. A product performance test method, comprising:
testing a specific heat capacity C of a heat storage material of a sample at a constant temperature phase and a temperature varying phase, testing a heat transfer coefficient K of the sample at the constant temperature phase and the temperature varying phase, testing energy efficiency ratios E of a refrigeration system of the sample at the constant temperature phase and a thermal load test phase, and testing a mass m of the heat storage material of the sample at the constant temperature phase, the thermal load test phase, and the temperature varying phase to detect a performance level of the sample, wherein at the constant temperature phase and a temperature varying phase, a heat leakage amount of the sample is Q=tKSΔT, wherein t is a time of a heat exchange occurring between an interior and an exterior of a cavity of the sample;

K is the heat transfer coefficient of the sample;

S is a heat exchange area of the sample;

ΔT is an internal and external environmental temperature difference of the cavity of the sample; and the heat leakage amount of the sample at the temperature varying phase dynamically changes;

at the constant temperature phase and the thermal load test phase, $$E = \frac{p_1 + p_3}{p_2},$$

wherein $P_1$ is a power value of a resistive element in the sample; $P_2$ is an input power value of the sample; and $P_3$ is a heat leakage power value of the sample;

at the temperature varying phase, a heat storage amount of the sample is Q'=CmΔT', wherein C is the specific heat capacity of the heat storage material in the sample;

m is the mass of the heat storage material in the sample; and

ΔT' is an initial temperature difference of the heat storage material in the cavity; and the sample is an environmental test equipment.

* * * * *